United States Patent
Moriya

(10) Patent No.: US 7,681,067 B2
(45) Date of Patent: Mar. 16, 2010

(54) BUS SYSTEM

(75) Inventor: Koji Moriya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 11/765,172

(22) Filed: Jun. 19, 2007

(65) Prior Publication Data

US 2008/0010391 A1 Jan. 10, 2008

(30) Foreign Application Priority Data

Jul. 4, 2006 (JP) .............................. 2006-184812
Jun. 6, 2007 (JP) .............................. 2007-150781

(51) Int. Cl.
*G06F 1/08* (2006.01)
*G06F 13/00* (2006.01)

(52) U.S. Cl. ....................... 713/600; 713/322; 713/503; 710/110

(58) Field of Classification Search .................. 713/320, 713/322, 323, 500, 501, 503, 600, 601; 710/110, 710/117, 124
See application file for complete search history.

(56) References Cited

U.S. PATENT DOCUMENTS

| 5,263,172 | A | * | 11/1993 | Olnowich | .................... 710/307 |
| 5,825,992 | A | * | 10/1998 | Satoh | ......................... 358/1.16 |
| 2004/0225863 | A1 | * | 11/2004 | Yamashita | ..................... 712/1 |
| 2007/0101031 | A1 | * | 5/2007 | Fujiwara et al. | ............. 710/113 |

FOREIGN PATENT DOCUMENTS

JP 2001-243176 A 9/2001

* cited by examiner

*Primary Examiner*—Dennis M Butler
(74) *Attorney, Agent, or Firm*—Fitzpatrick, Cella, Harper & Scinto

(57) ABSTRACT

It is so arranged that an appropriate deadline is assured with little consumption of power. A register (24) for remaining transfer time senses time that remains up to a limit by which data is to be transferred. A register (25) for remaining amount of data transfer senses the remaining amount of data that is to be transferred. The clock of the processing module is changed over dynamically based upon the remaining time sensed by the remaining transfer time register (24) and the remaining amount of transfer data sensed by the remaining transfer amount register (25).

8 Claims, 14 Drawing Sheets

BUS SYSTEM

BACKGROUND OF THE INVENTION

1. Field of the Invention

The present invention relates to a bus system and, more particularly, to an ideal bus system used in order that a bus master may transfer data to a bus slave via a bus.

2. Description of the Related Art

In an example of the prior art, a plurality of bus masters are connected on a bus and each bus master transfers data to a bus slave connected to the bus (see the specification of Japanese Patent Laid-Open No. 2001-243176). In this case, the general practice is such that a bus master outputs a transfer request to an arbiter (bus arbitration unit) on the bus and starts data transfer when permission to transfer is given by the arbiter. Further, a fixed priority scheme or round-robin scheme, etc., generally is used as the arbitration algorithm of the arbiter.

In bus arbitration based upon the fixed-priority or round-robin arbitration algorithm, however, it is difficult to assure a deadline required when each bus master performs a data transfer.

For example, even if a "sum of average bands" requested by each bus master within a certain prescribed time period falls within the range of a bus-allocatable band, the sum of bands requested by each of the bus masters may exceed the bus-allocatable band if attention is directed toward part of a time period within the prescribed time period.

In this case, with a simple arbitration algorithm such as the fixed-priority or round-robin arbitration algorithm, a problem which arises is that appropriate bus arbitration cannot be performed from the standpoint of assuring a deadline.

Furthermore, assume a case where there are hierarchically organized buses. If bus arbitration is performed by the simple arbitration algorithm, namely the fixed-priority or round-robin arbitration algorithm, for every hierarchical layer, then a bus master connected in a lower layer cannot always acquire the bus privilege preferentially in a higher layer. The problem which arises is that it is difficult to assure the deadline.

Further, a waiting state develops in a bus master having more transfer capability than necessary with respect to a deadline. In this case, a problem which arises is that power is consumed wastefully owing to supply of a clock even in the waiting state.

SUMMARY OF THE INVENTION

Accordingly, the present invention has been devised in view of the foregoing problems and its object is to assure an appropriate deadline with a small amount of power consumption.

According to the present invention, the foregoing object is attained by providing a bus system comprising: a transfer unit adapted to transfer data to a bus slave via a bus; a remaining-time measuring unit adapted to measure time that remains up to a limit by which the data is to be transferred; a remaining-data-amount measuring unit adapted to measure amount of data that remains to be transferred; and a clock changeover unit adapted to change over the processing clock of a processing module, which processes the data, based upon the remaining time measured by the remaining-time measuring unit and the remaining amount of data measured by the remaining-data-amount measuring unit.

Further features of the present invention will become apparent from the following description of exemplary embodiments (with reference to the attached drawings).

DESCRIPTION OF THE EMBODIMENTS

First Embodiment

A first embodiment of the present invention will be described with reference to the drawings.

Figure 1:
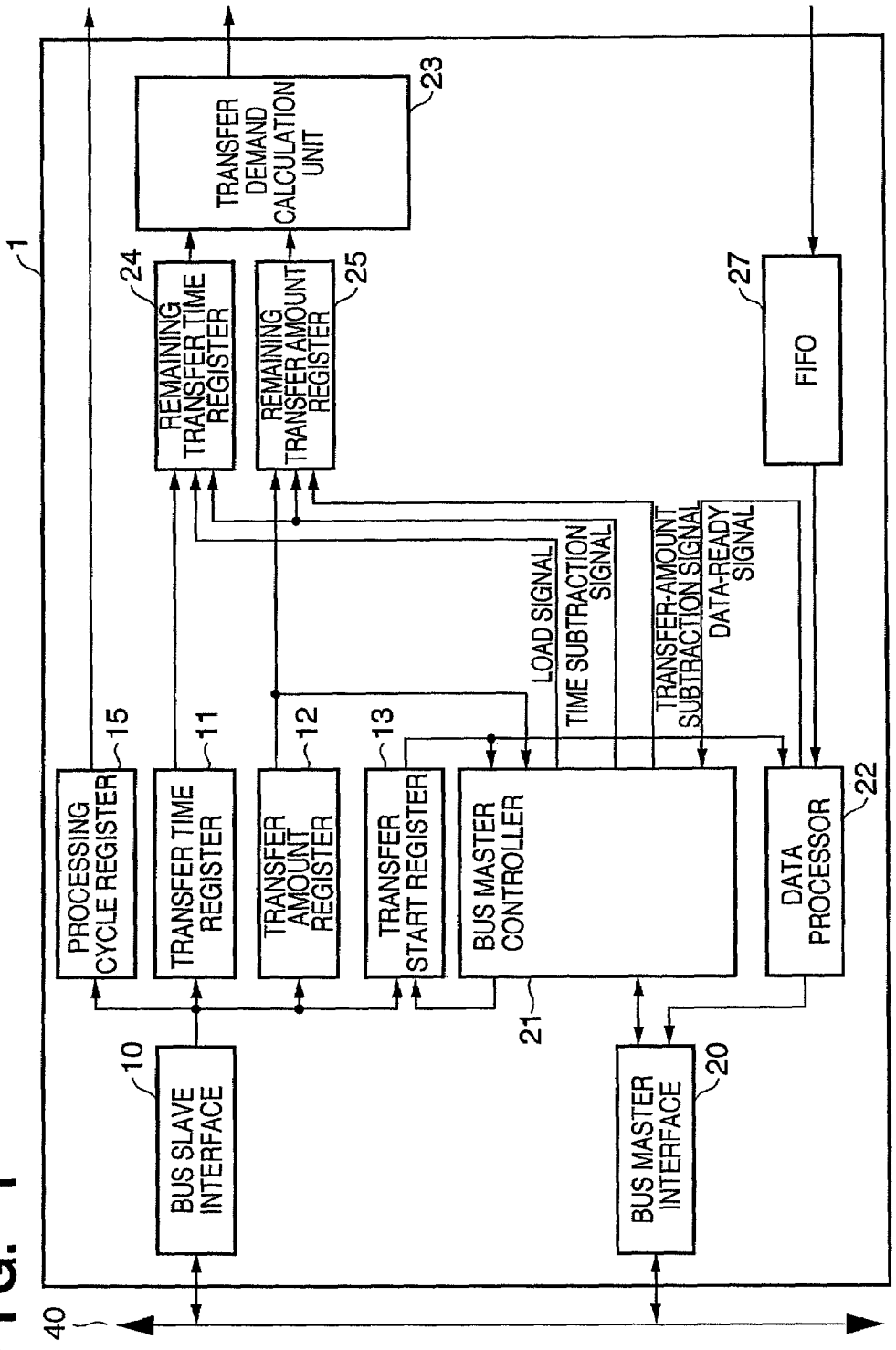
FIG. 1 is a block diagram illustrating an example of the structure of a bus master according to a first embodiment of the present invention.

FIG. 1 is a block diagram illustrating an example of the structure of a bus master.

As shown in FIG. 1, a bus master 1 includes a bus slave interface 10, a transfer time register 11, a transfer amount register 12, a transfer start register 13, a processing cycle register 15, a bus master interface 20 and a bus master controller 21. The bus master 1 further includes a data processor 22, a transfer demand calculation unit 23, a remaining transfer time register 24, a remaining transfer amount register 25 and a FIFO 27.

Figure 2:
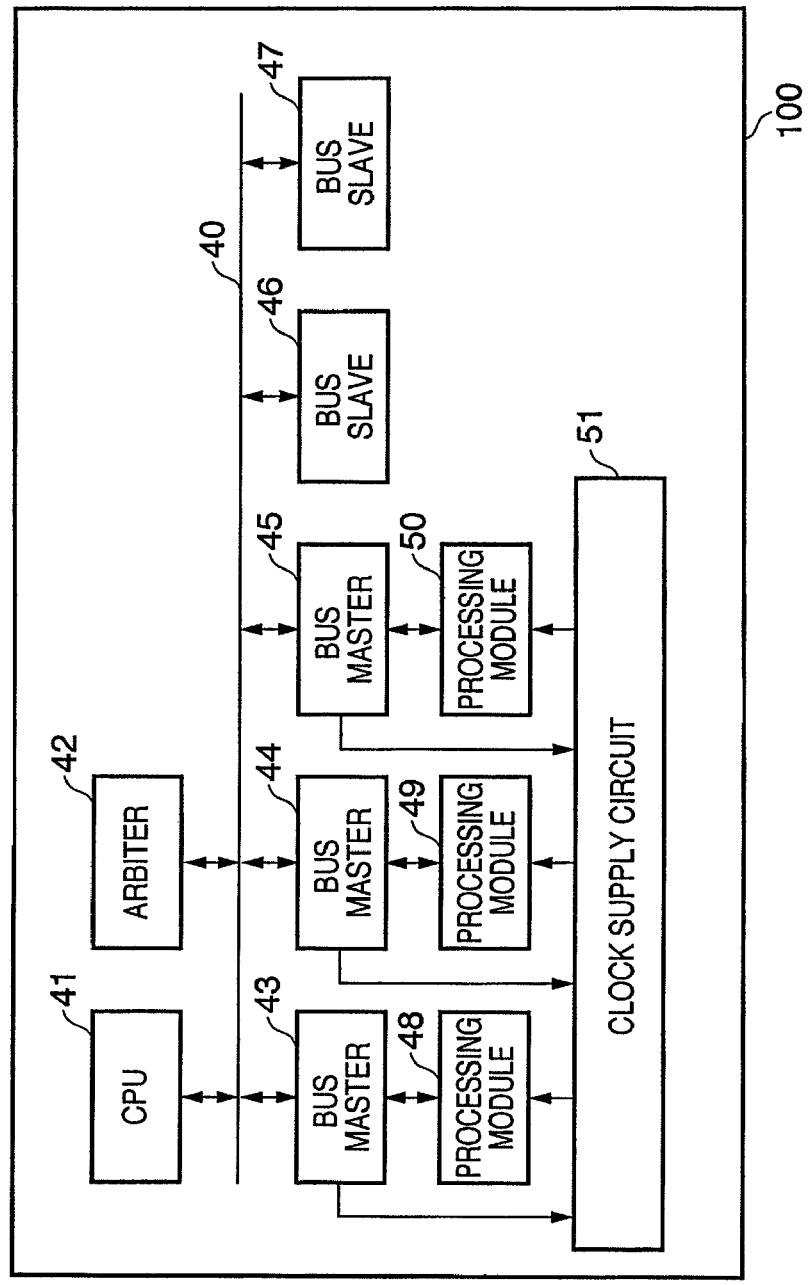
FIG. 2 is a block diagram illustrating an example of the configuration of a bus system using a bus master according to the first embodiment.

FIG. 2 is a block diagram illustrating an example of the configuration of a bus system using the bus master 1. This bus system is used in a computer system or image processing system, etc.

As shown in FIG. 2, an information processing apparatus 100 includes a bus 40, a CPU 41, an arbiter 42, bus masters 43 to 45, bus slaves 46, 47, processing modules 48 to 50, and a clock supply circuit 51. The bus masters 43 to 45 illustrated in FIG. 2 each correspond to the bus master 1 shown in FIG. 1.

First, an overview of the bus master 1 illustrated in FIG. 1 will be described.

The bus slave interface 10 is an interface for accepting register access from a CPU (which corresponds to the CPU 41 of FIG. 2) on the bus 40.

The transfer time register 11 is a transfer-time setting register for setting, in units of one microsecond, transfer time required for the bus master 1 to perform a data transfer (i.e., the transfer time is the maximum value of time from start of transfer to end of transfer). The transfer amount register 12 is a register for setting, in byte units, the amount of transfer of data performed by the bus master 1.

Further, the bus master 1 starts data transfer in response to writing of "1" to the transfer start register 13, and clears the value in the transfer start register 13 automatically when transfer is completed.

The FIFO 27 stores data from a processing module and stores data in a processing module temporarily in order to accommodate a disparity between the processing clock frequency of a processing module (which corresponds to processing modules 48 to 50 in FIG. 2) and the clock frequency of the bus 40. Owing to the provision of the FIFO 27, it can be so arranged that there will be no decline in the transfer efficiency of the bus 40 even if the processing clock frequency of a processing module is less than the clock frequency of the bus 40.

The bus master interface 20 is an interface for performing data transfer between a bus slave (which corresponds to the bus slaves 46, 47) on the bus 40 and the data processor 22, described later.

The bus master controller 21 controls the bus master interface 20, transfer start register 13, remaining transfer time register 24 (described later) and remaining transfer amount register 25.

The data processor 22 generates or receives transfer data. The functions with which the data processor 22 is equipped differ depending upon the functions required by the bus master 1. For example, the data processor 22 can be equipped with a block for executing image processing, an interface block for performing communication with an external unit, etc.

The details of the bus master 1 will be described next. If "1" is written to the transfer start register 13 from the CPU 41 on bus 40, then the bus master controller 21 asserts a load signal upon the remaining transfer time register 24 and remaining transfer amount register 25.

As a result, the value in the transfer time register 11 is copied to the remaining transfer time register 24 and the value in the transfer amount register 12 is copied to the remaining transfer amount register 25.

The bus master controller 21 subsequently asserts a time subtraction signal on the remaining transfer time register 24 every microsecond. As a result, whenever the time subtraction signal is received, the remaining transfer time register 24 subtracts one microsecond from its content to thereby measure time that remains up to the time limit for transfer of data. Further, the bus master controller 21 asserts a transfer-amount subtraction signal, which is for subtracting a number of bytes transferred whenever a data transfer is performed, upon the remaining transfer amount register 25. As a result, whenever the transfer-amount subtraction signal is received, the remaining transfer amount register 25, in accordance with the transfer-amount subtraction signal received, measures the amount of data remaining to be transferred, thereby measuring the remaining amount of data.

For example, one word on bus 40 is composed of 32 bytes in this embodiment. Therefore, "4" is asserted as the transfer-amount subtraction signal in a case where one word has been transferred, "2" is asserted as the transfer-amount subtraction signal in a case where a half-word has been transferred, and "1" is asserted as the transfer-amount subtraction signal in a case where a byte transfer has been performed. The remaining transfer amount register 25 subtracts the value of the transfer-amount subtraction signal from its own value.

By virtue of the above-described operation, the values in the remaining transfer time register 24 and remaining transfer amount register 25 are decremented and the values of the remaining transfer time and remaining amount of transfer are updated appropriately.

The data processor 22 also is started up by writing "1" to the transfer start register 13.

When data is capable of being transmitted or received, the data processor 22 asserts a data-ready signal upon the bus master controller 21.

Upon receiving the data-ready signal, the bus master controller 21 controls the bus master interface 20 so as to assert a transfer request signal upon an arbiter (which corresponds to the arbiter 42 in FIG. 2) on bus 40.

Meanwhile, the transfer demand calculation unit 23 calculates the request rate of data transfer based upon the values in the remaining transfer time register 24 and remaining transfer amount register 25. The request rate can be utilized to decide bus-master priority. The calculation formula used by the transfer demand calculation unit 23 in this embodiment is given by Equation (1) below.

request rate=[(value in remaining transfer amount register 25)/(value in remaining transfer time register 24)]     (1)

In accordance with Equation (1), the shorter the remaining time, the greater the transfer demand (request rate) in a case where the remaining amount of data is the same. On the other hand, the greater the remaining amount of data, the greater the transfer demand for the same remaining time. The transfer demand calculation unit 23 outputs the result of calculation of the request rate to the clock supply circuit 51.

Figure 3:
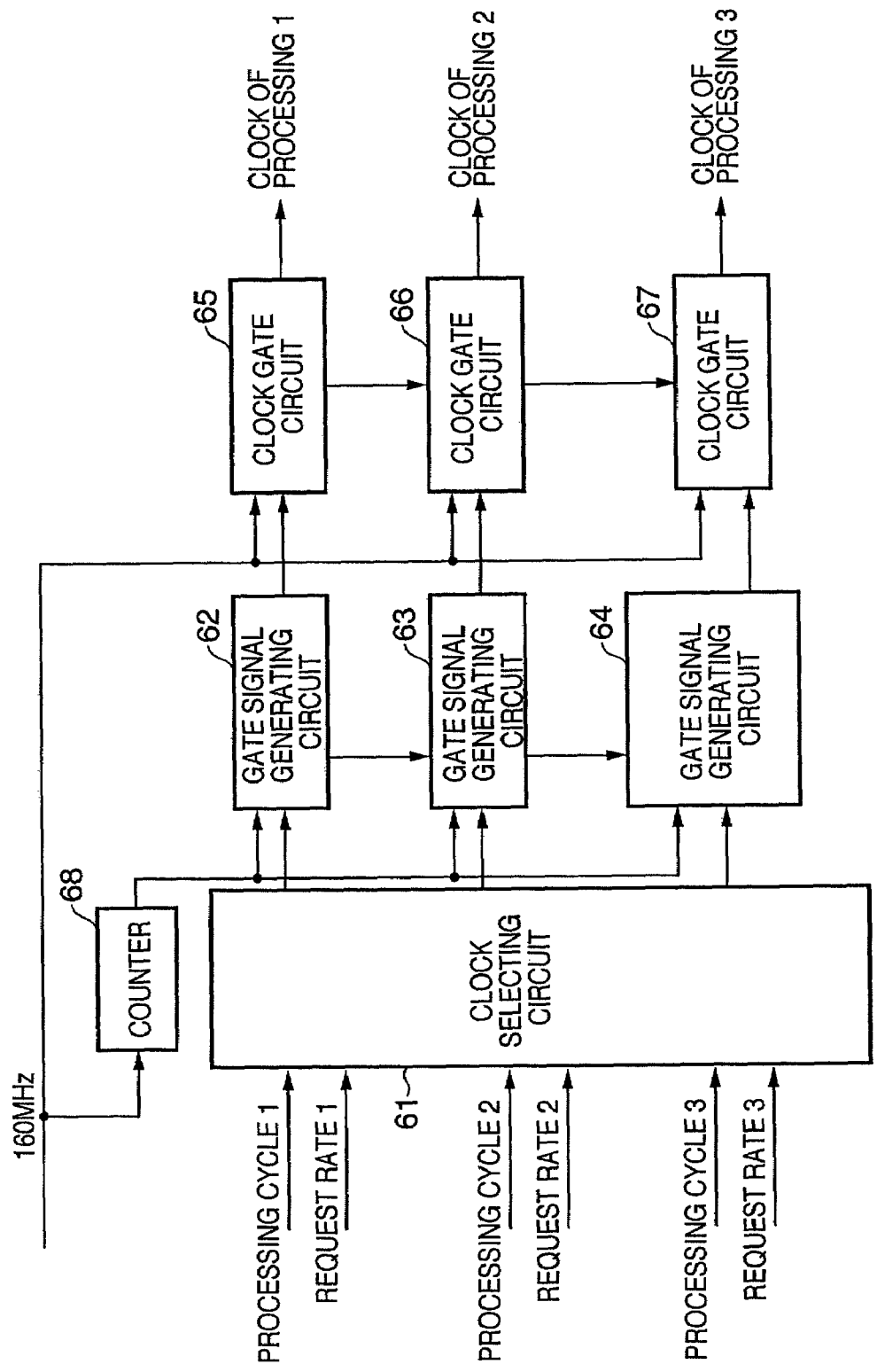
FIG. 3 is a diagram illustrating an example of the detailed structure of a clock supply circuit according to the first embodiment.

FIG. 3 is a diagram illustrating an example of the structure of the clock supply circuit 51 in detail.

As shown in FIG. 3, a clock selecting circuit 61 receives the request rates and processing cycles of the respective bus masters 43 to 45 as inputs and selects the optimum processing clocks with respect to the processing modules 48 to 50 connected to the bus masters 43 to 45, respectively. Here the processing cycle is a clock cycle required for the processing modules 48 to 50 to transfer one word to the FIFO 27 and represents the processing capability of each processing module. The processing cycle is set in the processing cycle register 15. Accordingly, each bus master is capable of detecting the processing capability of the processing module connected to it based upon the processing cycle that has been set in the processing cycle register 15.

A counter 68 counts based upon the transfer clock of the bus 40. In this embodiment, the counter 68 is a 160-MHz scale-of-160 counter 68.

Gate signal generating circuits 62 to 64 generate gate signals from the count value of the scale-of-160 counter 68 in order to output the frequency selected by the clock selecting circuit 61. Clock gate circuits 65, 66, 67 output clocks of frequencies decided by the gate signals generated by the gate generating circuits 62, 63, 64, respectively.

In this embodiment, it is possible to generate clocks of 0 to 160 MHz at a resolution of 1 MHz.

Figure 4:
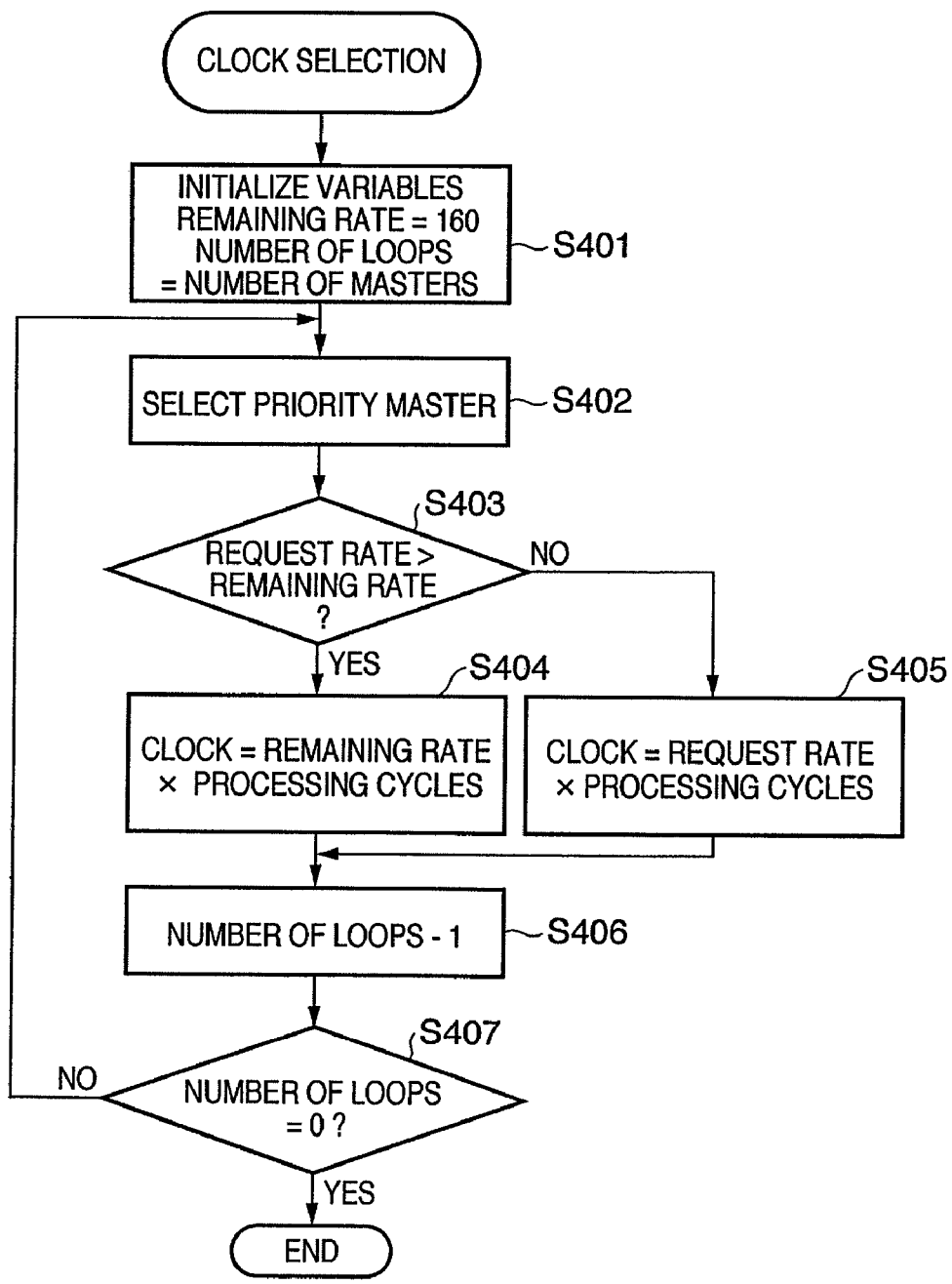
FIG. 4 is a flowchart illustrating an example of a detailed algorithm of the clock selecting circuit according to the first embodiment.

FIG. 4 is a flowchart illustrating an example of the algorithm of clock selecting circuit 61 in detail.

The clock selecting circuit 61 initializes variables at step S401. Specifically, the clock selecting circuit 61 sets the remaining rate to "160", which is the maximum transfer rate of bus 40. Here the transfer rate is expressed in MW/sec units and represents the amount of data per unit time ($M=10^6$, W=word). Further, the clock selecting circuit 61 sets the number of loops to the overall number of bus masters. In the example illustrated in FIG. 2, the number of loops is set to "3".

Next, on the basis of the request rates, the clock selecting circuit 61 selects the bus master that is to take precedence. Here the clock selecting circuit 61 selects the bus master for which the request rate is high. That is, a high priority is given to the bus master having the high request rate. In a case where the request rates are the same, the bus master having the smallest master number (Master No.) is given priority.

Next, at step S403, the clock selecting circuit 61 determines whether the request rate of the bus master selected at step S402 is greater than the remaining rate. If the result of the determination is that request rate of the bus master selected at step S402 is greater than the remaining rate ("YES" at step S403), then control proceeds to step S404. On the other hand, if the remaining rate is greater than the request rate ("NO" at step S403), then control proceeds to step S405.

If control proceeds to step proceeds to step S404, the clock selecting circuit 61 sets the clock frequency of the processing module connected to the bus master selected as the priority master at step S402 to a value obtained as a result of multiplying the remaining rate by the processing cycles of this bus master. This set value is equal to a clock frequency which is for allowing this processing module to attain the remaining rate. Further, if the frequency resolution (1 MHz in this embodiment) involves a fraction, the set value is rounded up.

If the clock frequencies of the processing modules 48 to 50 are thus set, control proceeds to step S406. Here the clock selecting circuit 61 subtracts "1" from the number of loops.

Next, at step S407, the clock selecting circuit 61 determines whether the number of loops is zero. If the determination is that the number of loops is zero ("YES" at step S407), then clock selection processing is exited. If the number of loops is not zero ("NO" at step S407), on the other hand, control returns to step S402 and processing for selecting clock frequency is executed with regard to a bus master that has not yet been selected.

By executing the processing of FIG. 4 periodically, it is possible to set dynamically the clock frequencies that are in accordance with the request rates of the bus masters 43 to 45 (i.e., to change over the clock dynamically).

Figure 5:
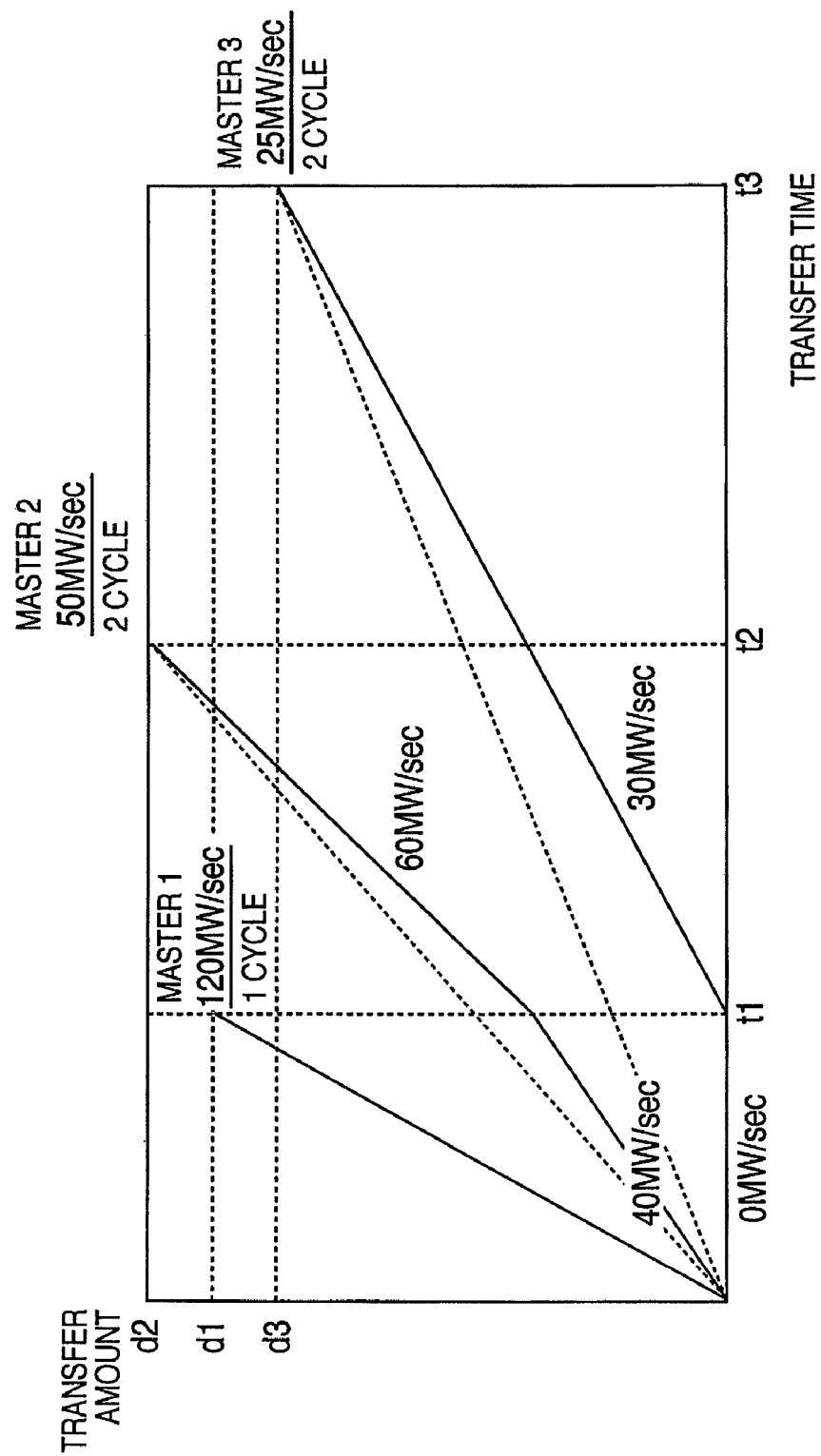
FIG. 5 is a diagram illustrating an example of conditions in a case where three bus masters have started transferring data simultaneously according in the first embodiment.

Reference will be had to FIG. 5 to describe a specific example of processing for setting clock frequency dynamically in this embodiment. FIG. 5 is a diagram illustrating an example of conditions in a case where three bus masters have started transferring data simultaneously.

In this embodiment, the initial request rate of bus master 43 (MASTER 1) is 120 MW/sec where the amount of data to be transferred is d1 and the target transfer time (deadline) is t1. Further, the initial request rate of bus master 44 (MASTER 2) is 50 MW/sec where the amount of data to be transferred is d2 and the target transfer time (deadline) is t2. Further, the initial request rate of bus master 45 (MASTER 3) is 25 MW/sec where the amount of data to be transferred is d3 and the target transfer time (deadline) is t3. It should be noted that d2>d1>d3 holds in this embodiment. In addition, the processing cycles of the processing modules 48 to 50 connected to the bus masters 43 to 45, respectively, are as follows: The processing cycles of processing modules 48, 49 and 50 are one cycle, two cycles and two cycles, respectively.

When transfer has started, the request rate of bus master 43 (MASTER 1) is the greatest and therefore data is transferred so as to satisfy the request of bus master 43 (MASTER 1). Consequently, the processing module 48 connected to the bus master 43 (MASTER 1) is supplied with a 120-MHz clock that is the result of multiplying the request rate by the processing cycles.

The bus master given priority next is bus master 44 (MASTER 2). Accordingly, the clock frequency of bus master 44 (MASTER 2) is decided so as to satisfy the transfer request of bus master 43 (MASTER 1). In other words, since the maximum transfer capability of bus 40 is 160 MW/sec, the maximum value the transfer rate of bus master 44 (MASTER 2) takes on is the remaining rate (40 MW/sec), which is the result of subtracting 120 MW/sec from 160 MW/sec.

Although the request rate of bus master 44 (MASTER 2) is 50 MW/sec, this request rate exceeds the remaining rate. Consequently, the processing module 49 connected to the bus master 44 (MASTER 2) is supplied with an 80-MHz clock that is the result of multiplying the remaining rate (40 MW/sec) by the processing cycles.

The request rate of bus master 45 (MASTER 3) is 25 MW/sec. However, when it is so arranged that data transfer by the bus masters 43 and 44 (MASTER 1 and MASTER 2) is satisfied, the remaining rate is zero. Consequently, the processing module 50 connected to bus master 45 (MASTER 3) is supplied with 0 MHz (i.e., this module is in the quiescent state).

When transfer time t1 elapses, bus master 43 (MASTER 1) terminates transfer of all of data amount d1. When this occurs, the request rate of bus master 43 (MASTER 1) is zero.

The request rate of bus master 44 (MASTER 2) at the moment transfer time t1 elapses is $(d2-40\ MW \cdot t1)/(t2-t1) = 60$ MW/sec, and the request rate of bus master 45 (MASTER 3) is $d3/(t3-t1)=30$ MW/sec. Accordingly, bus master 44 (MASTER 2) for which the request rate is high is given priority over bus master 45 (MASTER 3), and processing module 49 connected to bus master 44 (MASTER2) is supplied with a 120-MHz clock that is the result of multiplying the request rate by the processing cycles. As a result, the remaining rate is 160 MW/sec−60 MW/sec=100 MW/sec. The request rate (30 MW/sec) of bus master 45 (MASTER 3) does not exceed the remaining rate, and therefore the processing module 50 connected to bus master 45 (MASTER 3) is supplied with a 60-MHz clock obtained by multiplying the request rate by the processing cycles.

When transfer time t2 elapses, bus master 44 (MASTER 2) terminates transfer of all of data amount d2. When this occurs, the request rate of bus master 44 (MASTER 2) is zero.

The request rate of bus master 45 (MASTER 3) at the moment transfer time t2 elapses is $[d3-(t2-t1) \cdot 30\ MW]/(t3-t2)$, and the processing module 50 connected to bus master 45 (MASTER 3) continues to be supplied with the 60-MHz clock that is the result of multiplying the request rate by the processing cycles.

When transfer time t3 elapses, bus master 45 (MASTER 3) terminates transfer of all of data amount d3. When this occurs, the request rate of bus master 45 (MASTER 3) is zero.

It should be noted that in this embodiment, the number of bus masters and the processing modules connected to these bus masters is not limited to three.

Further, the counter 68 illustrated in FIG. 3 is not limited to the 160-MHz scale-of-160 counter. For example, in a case where the counter is a scale-of-8 counter, the resolution of the clock will be 20 MHz.

Furthermore, the selectable clock frequency may be one obtained by simple frequency division. For example, the selectable clock frequencies may be 160MHz, 80 MHz, 40 MHz, 20 MHz and 0 MHz. In this case, if it is so arranged that the clock of a processing module is changed over to the clock frequency closest to the request rate from among the selectable clock frequencies, it is possible to apply the algorithm of FIG. 4. Even if there is a stepwise frequency changeover, the deadline can be assured by performing control dynamically.

Second Embodiment

A second embodiment of the present invention will be described next. In the description that follows, portions in common with the first embodiment are not described in detail again.

Figure 6:
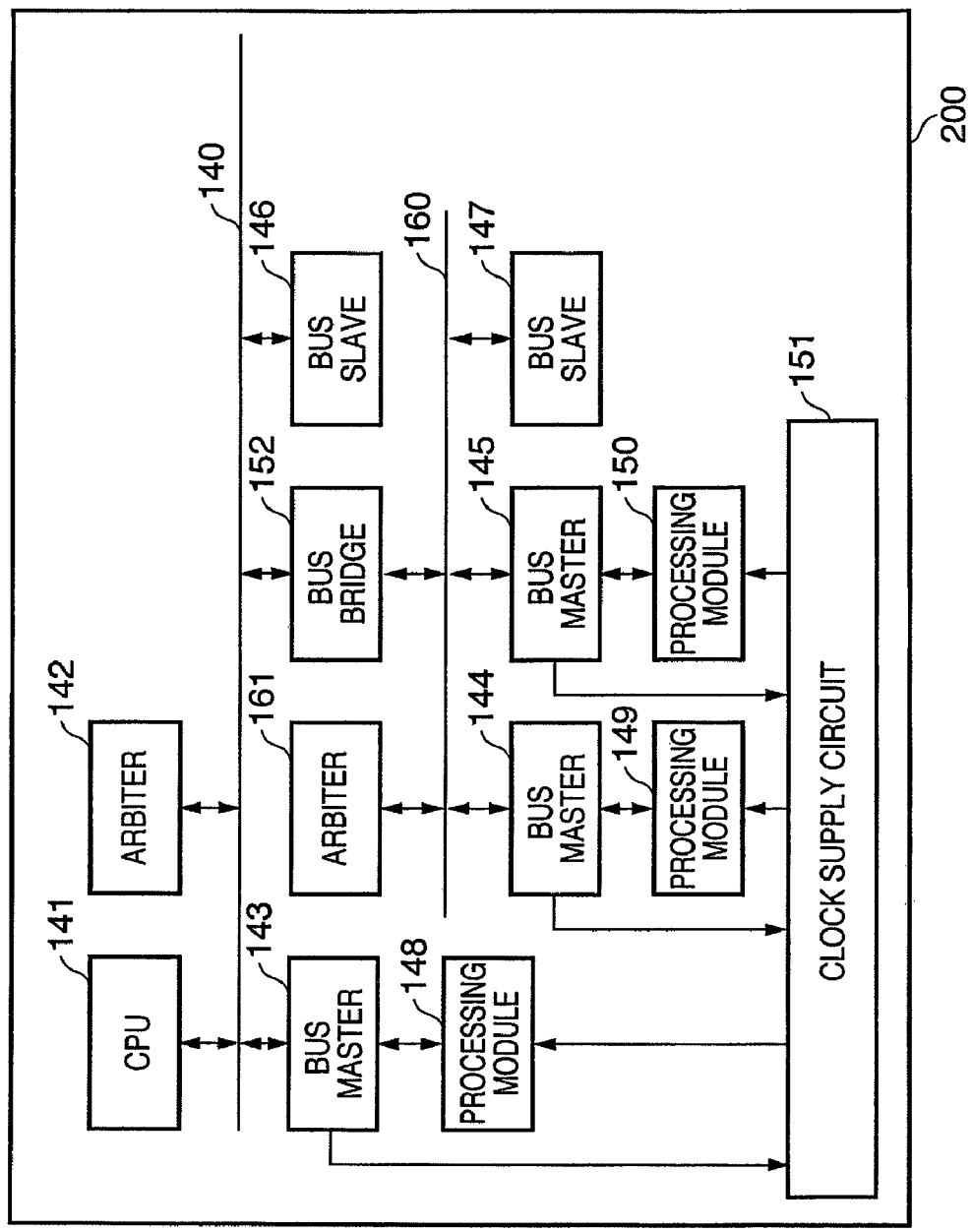
FIG. 6 is a block diagram illustrating an example of the configuration of a bus system according to a second embodiment of the present invention.

FIG. 6 is a block diagram illustrating an example of the configuration of a bus system.

As shown in FIG. 6, an information processing apparatus 200 includes a higher layer bus 140, a CPU 141, an arbiter 142, a bus master 143, a bus slave 146, a processing module 148 and a lower layer bus 160. The information processing apparatus 200 further includes bus master 144, 145, a bus slave 147, processing modules 149, 150, a clock supply unit 151 and a bus bridge 152.

The information processing apparatus 200 of this embodiment differs from the information processing apparatus 100 of FIG. 2 of the first embodiment in that hierarchical buses are provided, namely the higher layer bus 140 and the lower layer bus 160.

Transfer of data astride the bus hierarchy is performed via the bus bridge 152. Here it is assumed that transfer of data is performed by a 160-MHz clock on the higher layer bus 140 and by a 40-MHz clock on the lower layer bus 160. Accordingly, the maximum transfer rates of the buses are 160 MW/sec on the higher layer bus 140 and 40 MW/sec on the lower layer bus 160.

Figure 8:
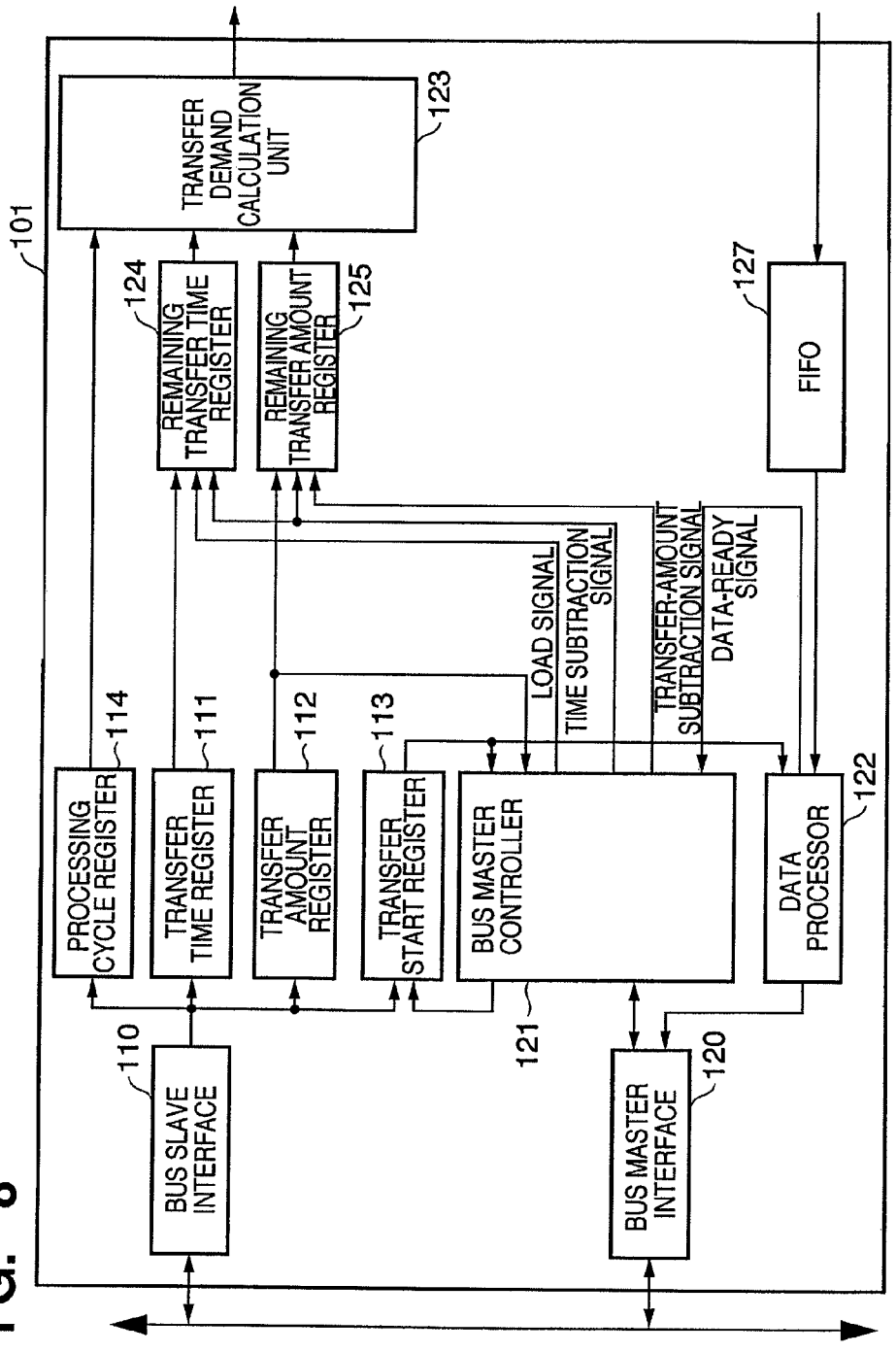
FIG. 8 is a block diagram illustrating an example of the structure of a bus master according to the second embodiment.

FIG. 8 is a block diagram illustrating an example of the structure of the bus master.

As shown in FIG. 8, a bus master 101 includes a bus slave interface 110, a transfer time register 111, a transfer amount register 112, a transfer start register 113, a transfer capability register 114, a bus master interface 120 and a bus master controller 121. The bus master 101 further includes a data processor 122, a transfer demand calculation unit 123, a remaining transfer time register 124, a remaining transfer amount register 125 and a FIFO 127.

The bus master 101 of this embodiment differs from the bus master 1 of FIG. 1 described in the first embodiment in the following two points: First, the bus master 101 of this embodiment does not have the processing cycle register 15 that sets the processing cycle of the processing module connected to the bus master. Second, the bus master 101 of this embodiment has the transfer cycle register 114. The transfer cycle register 114 is a register for setting the bus-master transfer cycle (transfer capability) found using Equation (2), described below.

The transfer cycle of the bus master 143 connected to the higher layer bus 140 is one cycle. The transfer cycles of the bus masters 144, 145 connected to the lower layer bus 160 are decided by Equation (2) below.

$$\text{transfer cycle} = [(\text{clock frequency of higher layer bus 140})/(\text{clock frequency of lower layer bus 160})] \quad (2)$$

As mentioned above, the clock frequency of the higher layer bus 140 is 160 MHz, and the clock frequency of the lower layer bus 160 is 40 MHz. Accordingly, the transfer cycle of the bus master 143 (MASTER 1) is one cycle, and the transfer cycles of bus masters 144 and 145 (MASTER 2 and MASTER 3) are 160/40=four cycles.

The transfer demand calculation unit 123 calculates the request rate of the data transfer and the demand based upon the values in the remaining transfer time register 124 and remaining transfer amount register 125 and the value in the transfer cycle register 114 set beforehand by the CPU 141.

The transfer demand calculation unit 123 of this embodiment finds the request rate using Equation (3) below.

$$\text{request rate} = [(\text{value in remaining transfer amount register 125})/(\text{value in remaining transfer time register 124})] \quad (3)$$

Further, the transfer demand calculation unit 123 finds the demand using Equation (4) below.

$$\text{demand} = (\text{request rate}) \times (\text{value in transfer cycle register 114}) \quad (4)$$

In accordance with Equations (3) and (4), if the transfer cycles of the bus masters are the same and the remaining amounts of data are the same, then the shorter the remaining time, the greater the transfer demand.

On the other hand, if the transfer cycles of the bus masters are the same and the remaining times are the same, then the greater the greater the remaining amount of data, the greater the transfer demand.

Furthermore, if the remaining amounts of data are the same and the remaining times are the same, then the larger the transfer cycle of the bus master, the greater the transfer demand.

The transfer demand calculation unit 123 outputs the result of calculation of the transfer demand and the result of calculation of the request rate to the clock supply unit 151.

The timing at which a transfer demand signal is asserted is the same cycle as that of the start of assertion of the transfer request signal, and the values of the transfer demand and request rate are held until the transfer of data is completed.

Figure 10:
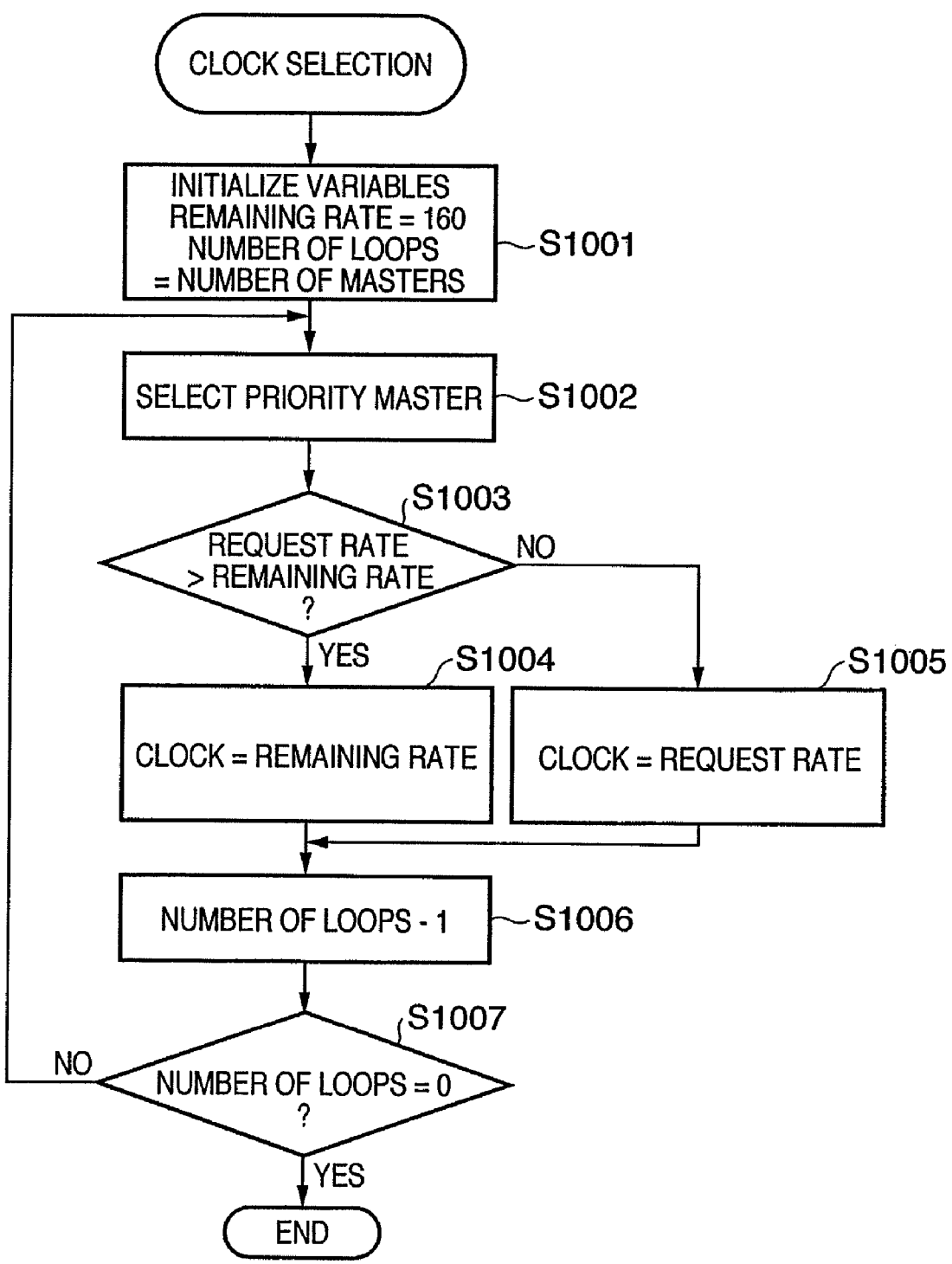
FIG. 10 is a flowchart illustrating an example of a detailed algorithm of a clock selecting circuit according to the second embodiment.

FIG. 10 is a flowchart illustrating an example of the algorithm of clock selecting circuit 161 in detail.

The processing of steps S1001 to S1003 and steps S1006, S1007 in FIG. 10 is identical with that of steps S401 to S403 and steps S406, 407 in FIG. 4 described in the first embodiment.

The flowchart of FIG. 10 differs from that of FIG. 4 of the first embodiment in the following two points:

First, the clock selecting circuit 161 sets the clock to the remaining rate at step S1004. Second, the clock selecting circuit 161 sets the clock to the request rate at step S1005.

According to this embodiment, it is assumed that all of the processing modules 148 to 150 connected to the bus masters 143 to 145, respectively, are capable of transferring one word by one clock; the processing cycles of the processing modules 148 to 150 are not taken into consideration. However, in a case where a plurality of clocks are required in order for the processing modules 148 to 150 to transfer one word, the processing cycles of the processing modules described in the first embodiment must be taken into account.

Figure 9:
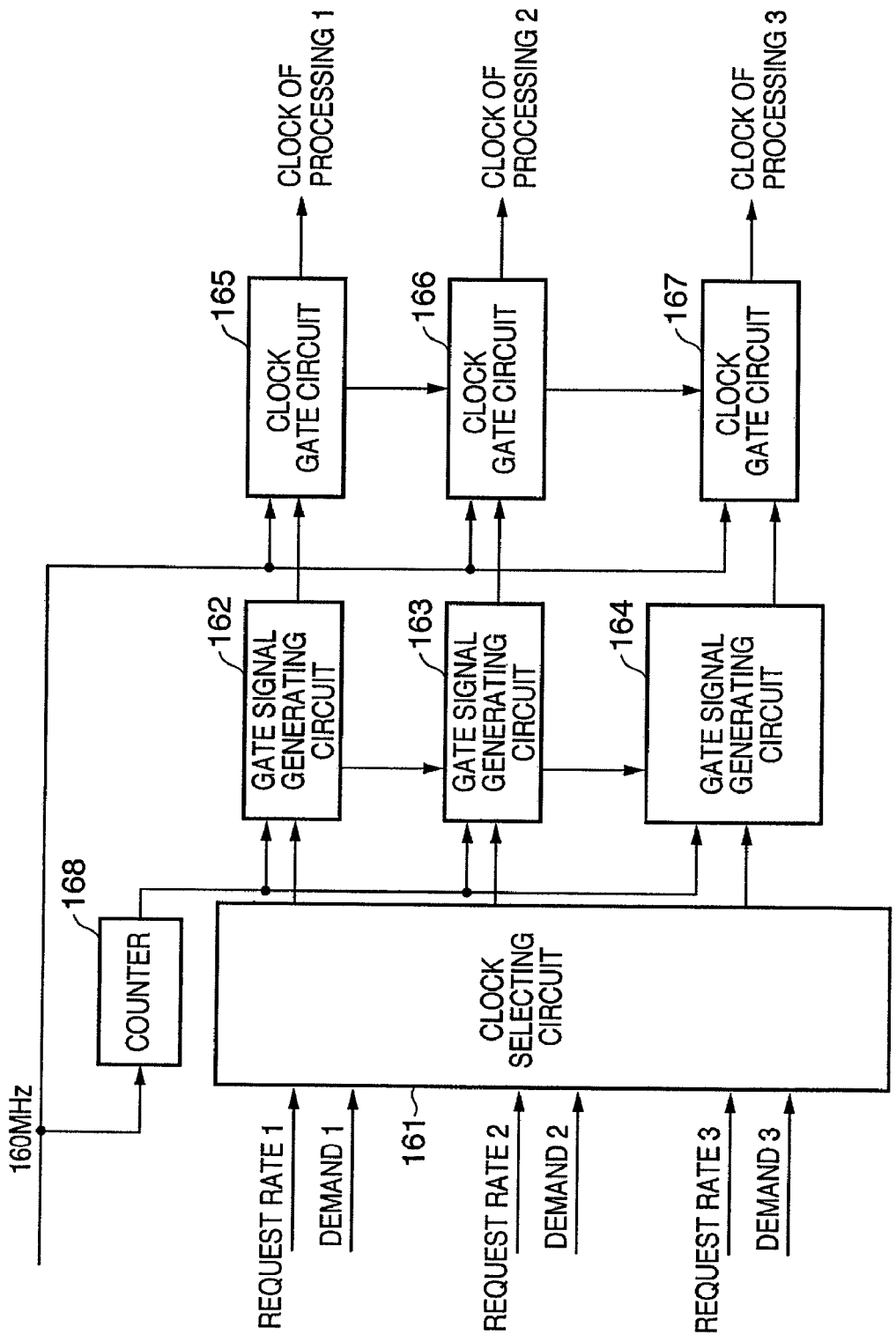
FIG. 9 is a diagram illustrating an example of the detailed structure of a clock supply circuit according to the second embodiment.

FIG. 9 is a diagram illustrating an example of the structure of the clock supply circuit 151 in detail.

Shown in FIG. 9 are the clock selecting circuit 161, clock gate circuits 165 to 167 and gate signal generating circuits 162 to 164.

The clock supply unit 151 of FIG. 9 differs from the clock supply circuit 51 of FIG. 3 described in the first embodiment in the following two points: First, the clock supply unit 151 of FIG. 9 does not receive inputs of the processing cycles of the processing modules 148 to 150 connected to the bus masters 143 to 145, respectively. Second, the clock supply unit 151 receives inputs of demands that are output from the transfer demand calculation units 123 of the respective bus masters 143 to 145.

Figure 7:
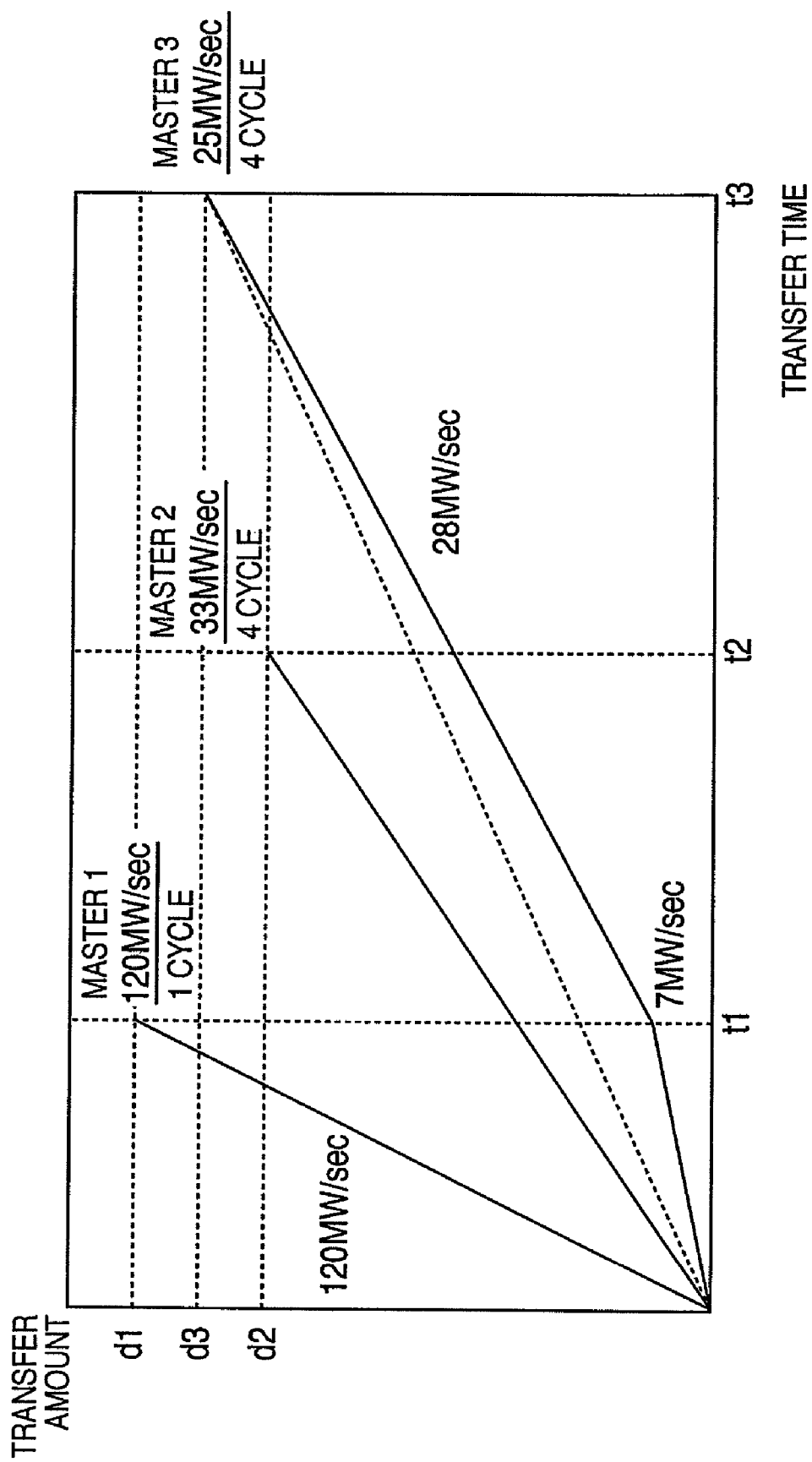
FIG. 7 is a diagram illustrating an example of conditions in a case where bus masters in which a bus is hierarchical have started transferring data simultaneously according in the second embodiment.

Reference will be had to FIG. 7 to describe a specific example of processing for setting clock frequency dynamically in this embodiment. FIG. 7 is a diagram illustrating an example of conditions in a case where bus masters with hierarchically organized buses have started transferring data simultaneously.

In this embodiment, the initial request rate of bus master 143 (MASTER 1) is 120 MW/sec where the amount of data to be transferred is d1 and the target transfer time (deadline) is t1. Further, the initial request rate of bus master 144 (MASTER 2) is 33 MW/sec where the amount of data to be transferred is d2 and the target transfer time (deadline) is t2. Further, the initial request rate of bus master 145 (MASTER 3) is 25 MW/sec where the amount of data to be transferred is d3 and the target transfer time (deadline) is t3. It should be noted that d1>d3>d2 holds in this embodiment. In addition, the transfer cycles of bus masters 143 (MASTER 1), 144 (MASTER 2) and 145 (MASTER 5) are one, four and four, respectively.

In this case, the initial demand of bus master 143 (MASTER 1) is 120 (=120×1), the initial demand of bus master 144 (MASTER 2) is 132 (=33×4), and the initial demand of bus master 145 (MASTER 3) is 100 (=25×4). Thus, when data transfer starts, the demand of bus master 144 (MASTER 2) is the greatest.

What is noteworthy here is that despite the fact that the request rate of bus master 144 (MASTER 2) is lower than that of the bus master 143 (MASTER 1), the demand of the bus master 144 (MASTER 2) is greater than that of the bus master 143 (MASTER 1). The reason for this is that since the transfer capability of bus master 144 (MASTER 2) is low (in actuality, the transfer capability of the lower layer bus 160 is low), the urgency for assuring the deadline is greater for bus master 144 (MASTER 2) than for bus master 143 (MASTER 1).

Accordingly, data is transferred so as to satisfy the request of bus master 144 (MASTER 2). That is, the processing module 149 connected to bus master 144 (MASTER 2) is supplied with a 33-MHz clock.

The bus master given priority next is bus master 143 (MASTER 1). Accordingly, the clock frequency of bus master 143 (MASTER 1) is decided so as to satisfy the transfer request of bus master 144 (MASTER 2). In other words, since the remaining rate is 127 MW/sec, the request rate of the bus master 143 (MASTER 1) does not exceed the remaining transfer rate. Accordingly, the processing module 148 connected to bus master 143 (MASTER 1) is supplied with a 120-MHz clock. The remaining rate is 7 MW/sec. The request rate of bus master 145 (MASTER 3) exceeds the remaining rate. Therefore the processing module 150 connected to bus master 145 (MASTER 3) is supplied with a 7-MHz clock.

When transfer time t1 elapses, bus master 143 (MASTER 1) terminates transfer of all of data amount d1. When this occurs, the request rate of bus master 43 (MASTER 1) is zero.

The request rate of bus master 144 (MASTER 2) at the moment transfer time t1 elapses is (d2−t1−33 MW)/(t2−t1)=33 MW/sec, and the request rate of bus master 145 (MASTER 3) is (d3−t1−7 MW)/(t3−t1)=28 MW/sec. At this time the demand of bus master 144 (MASTER 2) is 132 (=33×4), and the demand of bus master 145 (MASTER 3) is 112 (=28×4). Accordingly, bus master 144 (MASTER 2) for which the demand is high is given priority over bus master 145 (MASTER 3), and processing module 149 connected to bus master 144 (MASTER2) is supplied with a 33-MHz clock.

The remaining rate is 127 MW/sec. This remaining rate exceeds the request rate of bus master 145 (MASTER 3). The processing module 150 connected to bus master 145 (MASTER 3), therefore, is supplied with a 28-MHz clock.

When transfer time t2 elapses, bus master 144 (MASTER 2) terminates transfer of all of data amount d2. This means that the request rate of bus master 144 (MASTER 2) is zero.

The demand of bus master 145 (MASTER 3) at the moment transfer time t2 elapses is [d3−(t1−7 MW)−t1)−28 MW]/(t3−t2)=28 MW/sec, and the processing module 150 connected to bus master 145 (MASTER 3) continues to be supplied with the 28-MHz clock.

When transfer time t3 elapses, bus master 145 (MASTER 3) terminates transfer of all of data amount d3. Accordingly, the request rate of bus master 145 (MASTER 3) is zero.

It should be noted that in FIG. 4 described in the first embodiment and in FIG. 7 described in this embodiment, a case where the bus transfer efficiency is 100% is assumed. On the other hand, in many cases an actual bus system experiences a decline in transfer efficiency owing to changeover of bus masters and latency of bus slaves.

In the first and second embodiments, however, each bus master monitors actual transfer time and amount of transfer. Accordingly, by raising demand or request rate by an amount equivalent to the decline in transfer efficiency, adjustment can be performed dynamically and it is possible to assure a deadline accurately with regard to each bus master.

By adopting the above-described arrangement and schemes and controlling the transfer clock of each bus master, it is possible to assure a suitable deadline with regard to each bus master.

Further, since the processing-module clock is optimized to data transfer, it is possible to reduce power consumption.

Third Embodiment

Figure 11:
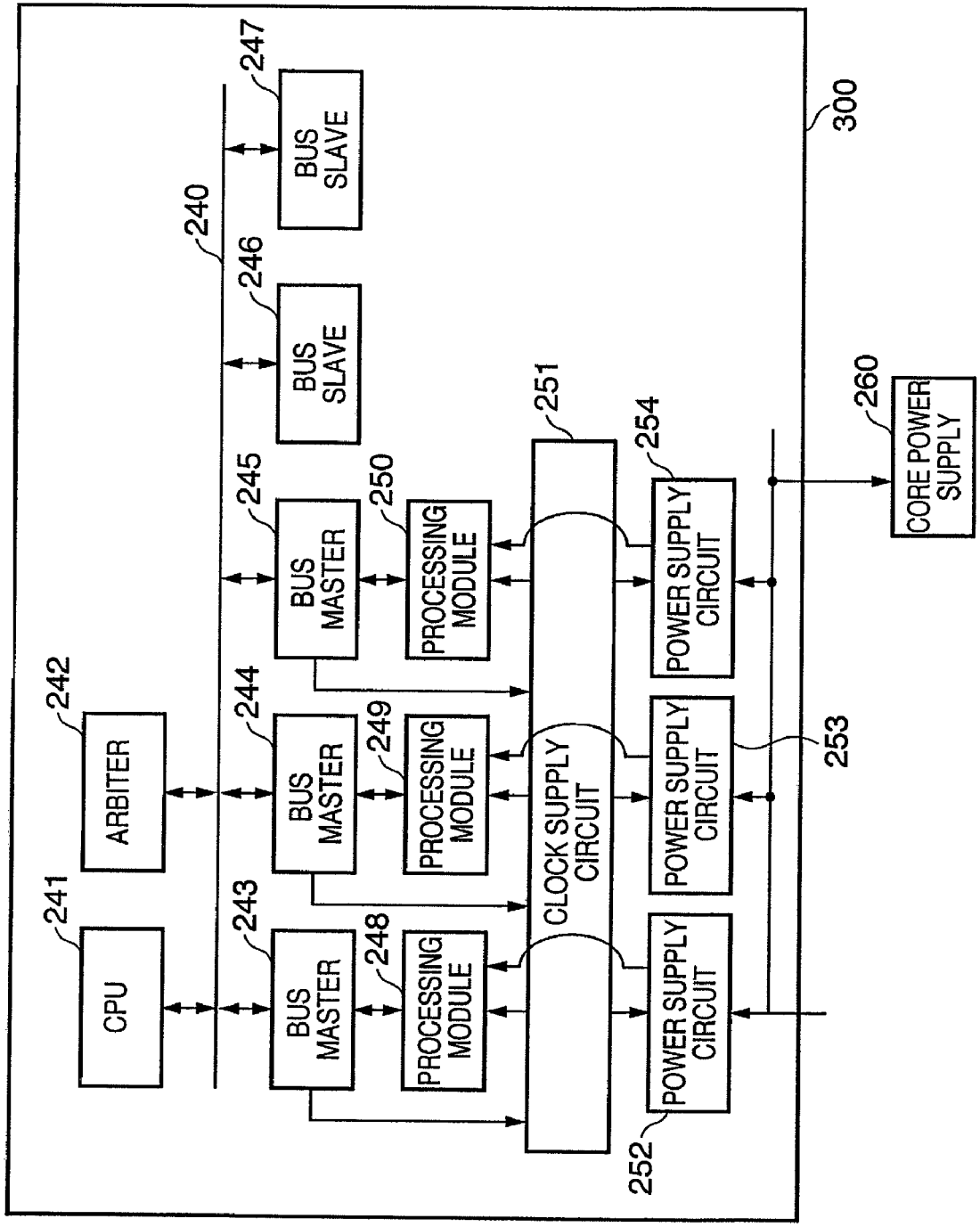
FIG. 11 is a block diagram illustrating an example of the configuration of a bus system using a bus master according to a third embodiment of the present invention.

FIG. 11 is a block diagram illustrating an example of the configuration of a bus system that employs the bus master 1. It should be noted that this bus system is used in a computer system or image processing system.

As shown in FIG. 11, an information processing apparatus 300 includes a bus 240, a CPU 241, an arbiter 242, bus masters 243 to 245, bus slaves 246, 247, processing modules 248 to 250, a clock supply circuit 251 and power supply circuits 252, 253, 254. It should be noted that each of the bus masters 243 to 245 illustrated in FIG. 11 corresponds to the bus master 1 shown in FIG. 1.

The power for driving the processing modules 248, 249, 250 is supplied from the power supply circuits 252, 253, 254. It is assumed that power for the other blocks 241, 242, 243, 244, 245, 246, 247, 251, 252, 253 and 254 is supplied from an external core power supply 260. Further, it is assumed that the processing modules 248, 249, 250 are configured in such a manner that no problems will arise even though these are supplied with power based upon voltage values that are different from those applied to the bus masters 243, 244, 245 and clock supply circuit 251.

Figure 12:
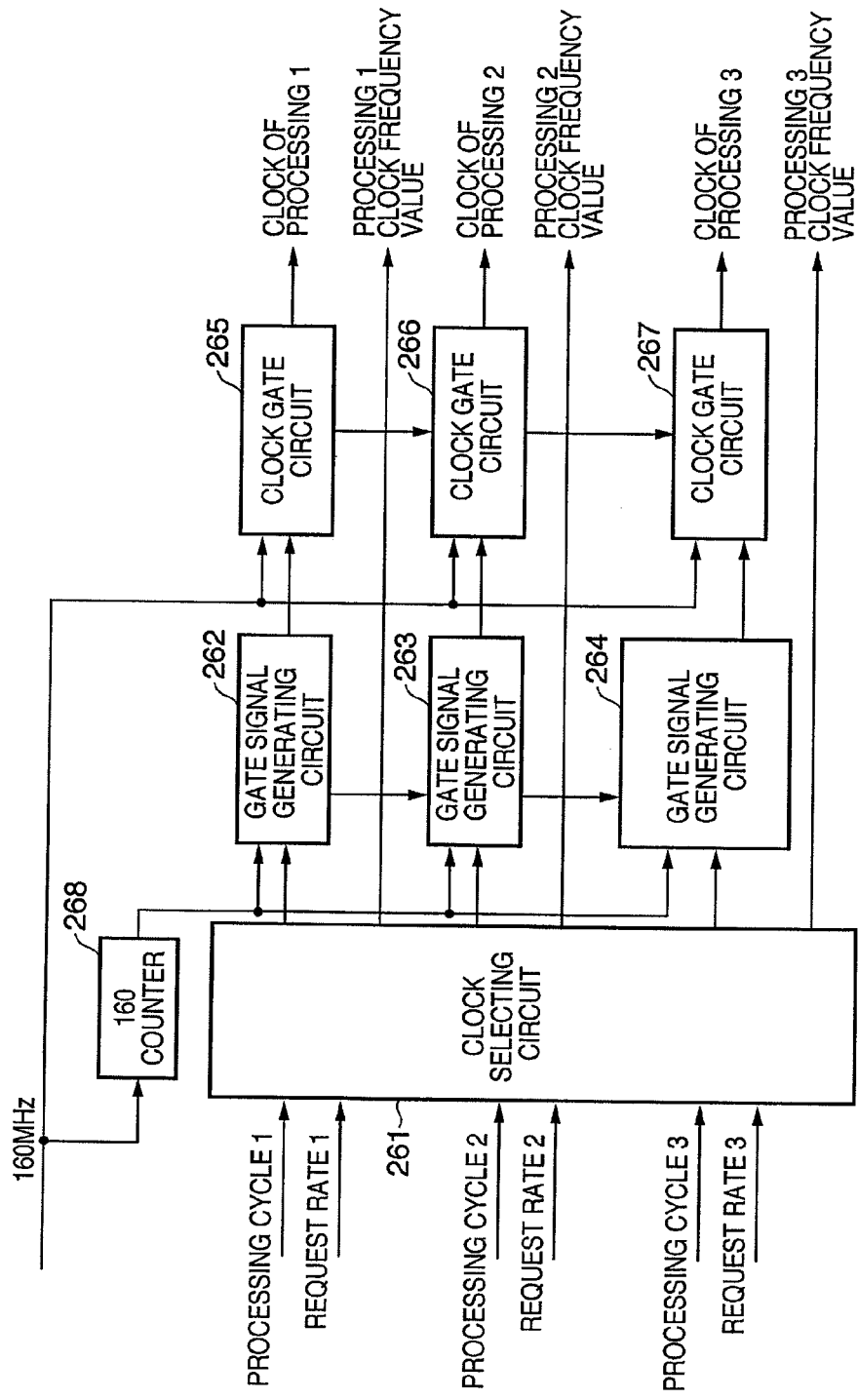
FIG. 12 is a diagram illustrating an example of the detailed structure of a clock supply circuit according to the third embodiment.

FIG. 12 is a diagram illustrating an example of the structure of the clock supply circuit 251 in detail.

Shown in FIG. 12 are a clock selecting circuit 261, clock gate circuits 265 to 267 and gate signal generating circuits 262 to 264.

The clock supply circuit 251 of FIG. 12 differs from the clock supply circuit 51 of FIG. 3 described in the first embodiment in that it outputs the frequency values of clocks of processing modules 248, 249, 250 generated by the clock selecting circuit 261. These clock frequency values are output to the power supply circuits 252, 253, 254 that supply driving power to the processing modules 248, 249, 250.

Figure 13:
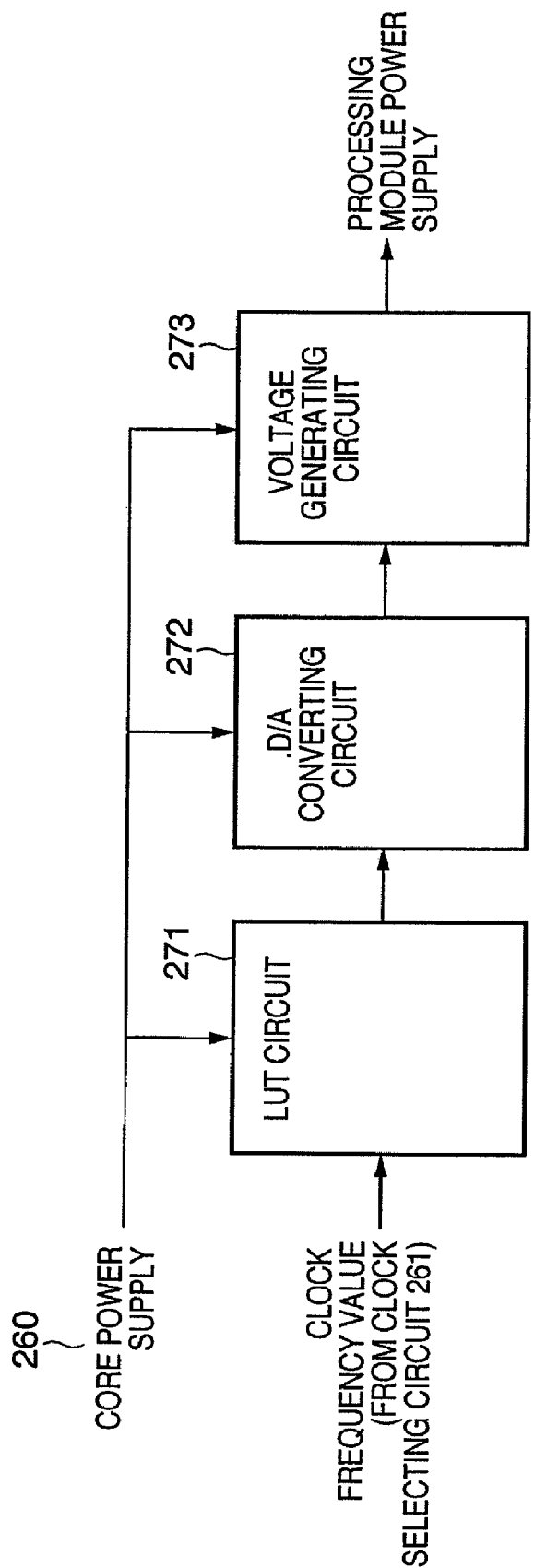
FIG. 13 is a diagram illustrating an example of the detailed structure of a power supply circuit according to the third embodiment.

FIG. 13 is a diagram illustrating an example of the structural details of the power supply circuits 252, 253, 254 of this embodiment.

As shown in FIG. 13, each power supply circuit includes a look-up table (LUT) 271 for converting a clock frequency value, which has been supplied from the clock selecting circuit 261 of clock supply circuit 251, to a voltage value; a digital-to-analog converting circuit (D/A circuit) 272 for converting a voltage value, which is a digital value provided by the LUT 271, to an analog value; and a voltage generating circuit 273 for generating the power of processing modules 248, 249, 250 from the core power supply in accordance with the analog value provided by the D/A converting circuit 272.

Figure 14:
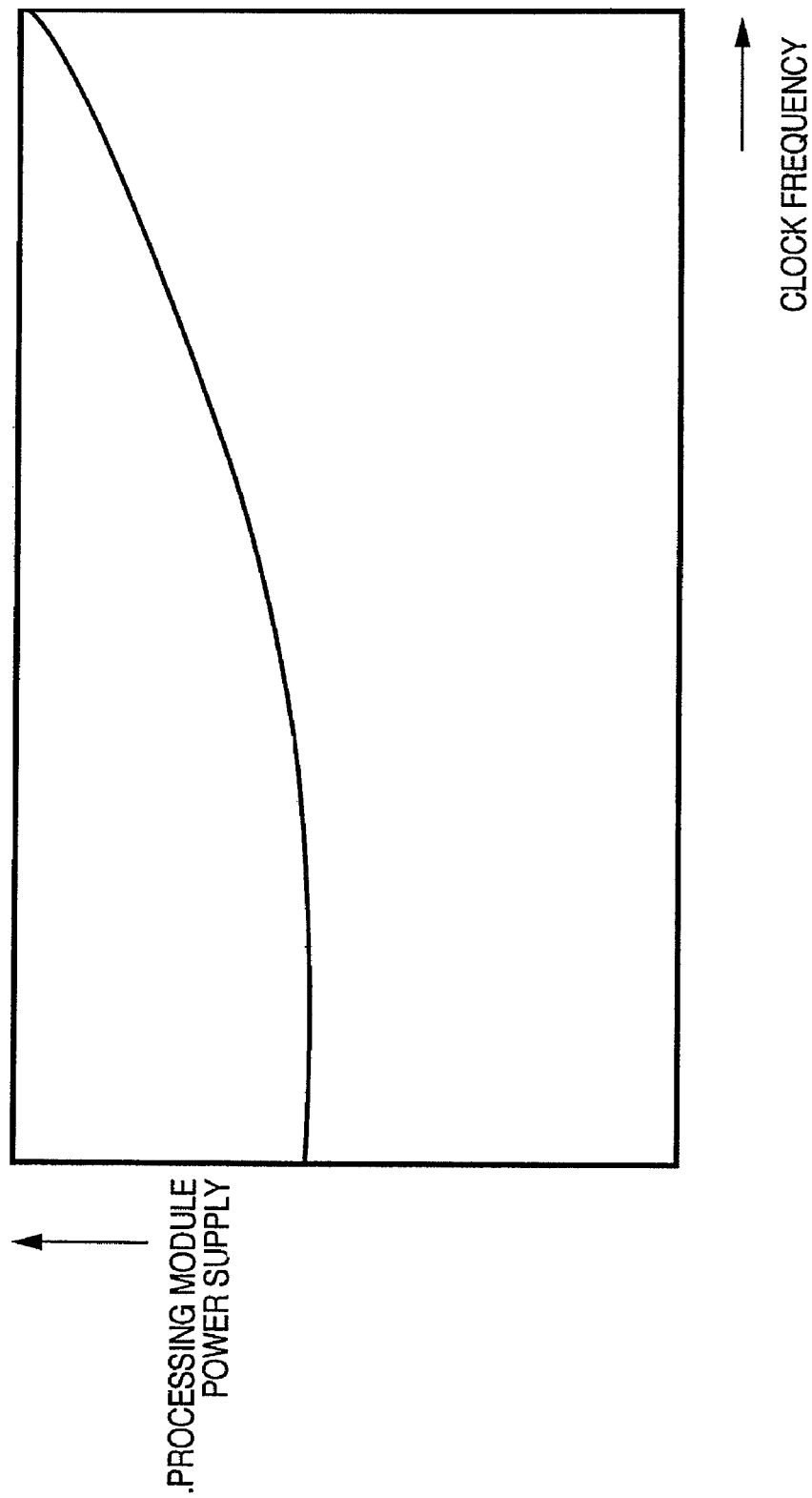
FIG. 14 is a diagram illustrating a frequency value vs. voltage value characteristic according to the third embodiment.

FIG. 14 is a diagram illustrating the characteristic of the LUT 271 whereby a frequency value is converted to a voltage value. At the maximum value of frequency, the voltage value is equal to the core voltage. When the frequency value falls, so does the voltage value. It will suffice if this characteristic is made to conform to the characteristic of a semiconductor utilized by the bus system of this embodiment.

As described above, the optimum frequency clock is supplied in accordance with the bus transfer conditions of the processing modules 248, 249, 250, and the optimum voltage conforming to clock frequency is supplied, thereby making it possible to reduce power consumption further.

In accordance with the present invention corresponding to each of the foregoing embodiments, the priority of a transfer request is decided based upon remaining time up to a limit by which data is to be transferred. Accordingly, the frequency of the processing clock of the processing module connected to the bus master having the shortest deadline can be increased preferentially and it is possible to increase the amount of transfer per unit time. Furthermore, it is possible to reduce the frequency of the processing clock of the processing module connected to a bus master that has exceeded the processing capability necessary for the deadline. As a result, it is possible to construct a bus system in which the optimum deadline is assured with little power consumption.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-184812, filed Jul. 4, 2006, 2007-150781, filed Jun. 6, 2007, which are hereby incorporated by reference herein in their entirety.

What is claimed is:

1. A bus system comprising:
a transfer unit adapted to transfer data to a bus slave via a bus;
a remaining-time measuring unit adapted to measure time that remains up to a limit by which the data is to be transferred;
a remaining-data-amount measuring unit adapted to measure amount of data that remains to be transferred; and
a clock changeover unit adapted to change over the processing clock of a processing module, which processes the data, based upon the remaining time measured by said remaining-time measuring unit and the remaining amount of data measured by said remaining-data-amount measuring unit.

2. The system according to claim 1, wherein said clock changeover unit changes over the processing clock based upon a ratio of remaining time, which has been calculated by said remaining-time measuring unit, to the remaining amount of data that has been calculated by said remaining-data-amount measuring unit.

3. The system according to claim 1, further comprising:
a transfer-time setting unit adapted to set transfer time of the data; and
a transfer-amount setting unit adapted to set transfer amount of the data;
wherein said remaining-time measuring unit measures the time that remains up to the limit by which the data is to be transferred, based upon the transfer time that has been set by said transfer-time setting unit; and
said remaining-data-amount measuring unit measures the amount of the data that remains to be transferred, based upon the transfer amount that has been set by said transfer-amount setting unit.

4. The system according to claim 1, further comprising:
a plurality of bus master devices each having at least said transfer unit, said remaining-time measuring unit and said remaining-data-amount measuring unit; and
a priority deciding unit adapted to decide priorities based upon request rates of said plurality of bus master devices;
wherein said clock changeover unit changes over clocks of processing modules connected to respective ones of said plurality of bus master devices based upon the priorities that have been decided by said priority deciding unit and the request rates.

5. The system according to claim 4, wherein each of said plurality of bus master devices has a transfer-capability setting unit adapted to set transfer capability of the data; and
said priority deciding unit decides priority based upon a ratio of the request rate to the transfer capability of the data.

6. The system according to claim 1, wherein each of a plurality of bus master devices has processing-capability detecting unit adapted to detect the processing capability of a processing module connected to the bus master device itself; and
said clock changeover unit changes over the clocks of processing modules connected to respective ones of said plurality of bus master devices based upon request rates of the plurality of bus master devices and the processing capabilities detected by said processing-capability detecting unit.

7. The system according to claim 4, wherein each of said plurality of bus master devices has a processing-capability detecting unit adapted to detect the processing capability of a processing module connected to the bus master device itself; and
said clock changeover unit changes over the clocks of processing modules connected to respective ones of said plurality of bus master devices based upon the priorities decided by said priority deciding unit, the request rates and the processing capabilities detected by said processing-capability detecting unit.

8. The system according to claim 1, further comprising a unit adapted to change over voltage of a power supply, which drives each processing module, in accordance with the frequency of the clock changed over by said clock changeover unit.

\* \* \* \* \*